US011685036B2

(12) United States Patent
Benzing (10) Patent No.: US 11,685,036 B2
(45) Date of Patent: Jun. 27, 2023

(54) MOTOR MOUNTING ASSEMBLY FOR A POWER TOOL

(71) Applicant: TECHTRONIC CORDLESS GP, Anderson, SC (US)

(72) Inventor: Glenn L. Benzing, Easley, SC (US)

(73) Assignee: Techtronic Cordless GP, Anderson, SC (US)

( * ) Notice: Subject to any disclaimer, the term of this patent is extended or adjusted under 35 U.S.C. 154(b) by 353 days.

(21) Appl. No.: 16/939,432

(22) Filed: Jul. 27, 2020

(65) Prior Publication Data

US 2022/0024018 A1 Jan. 27, 2022

(51) Int. Cl.
| | | |
|---|---|---|
| *B25F 5/02* | (2006.01) | |
| *B25F 5/00* | (2006.01) | |
| *H02K 7/14* | (2006.01) | |
| *H02K 7/08* | (2006.01) | |
| *H02K 7/116* | (2006.01) | |
| *B25D 16/00* | (2006.01) | |
| *B25D 17/04* | (2006.01) | |

(52) U.S. Cl.
CPC .............. *B25F 5/02* (2013.01); *B25F 5/001* (2013.01); *H02K 7/08* (2013.01); *H02K 7/116* (2013.01); *H02K 7/145* (2013.01); *B25D 16/006* (2013.01); *B25D 17/04* (2013.01); *B25D 2216/0084* (2013.01); *B25D 2250/121* (2013.01)

(58) Field of Classification Search
CPC . H02K 7/06; H02K 7/116; H02K 7/08; H02K 7/145; B25F 5/02; B25F 5/001
See application file for complete search history.

(56) References Cited

U.S. PATENT DOCUMENTS

| | | | |
|---|---|---|---|
| 3,491,840 | A | 1/1970 | Haviland et al. |
| 6,025,662 | A | 2/2000 | Nakane |
| 6,234,256 | B1 | 5/2001 | Kettner |
| 6,719,067 | B2 | 4/2004 | Taga |
| 7,040,414 | B1 | 5/2006 | Kuo |
| 8,141,654 | B2 | 3/2012 | Lin |
| 8,460,153 | B2 | 6/2013 | Rudolph et al. |
| 8,714,279 | B2 | 5/2014 | Nagasaka et al. |
| 8,757,286 | B2 | 6/2014 | Nagasaka et al. |

(Continued)

FOREIGN PATENT DOCUMENTS

| | | |
|---|---|---|
| CN | 1301372 C | 2/2007 |
| CN | 102476369 A | 5/2012 |

(Continued)

OTHER PUBLICATIONS

Extended European Search Report for Application No. 21188088.5 dated Nov. 29, 2021 (9 pages).

*Primary Examiner* — Bernard Rojas
(74) *Attorney, Agent, or Firm* — Michael Best & Friedrich LLP (57) ABSTRACT

A power tool includes a housing and an electric motor supported within the housing. The housing includes a main housing portion that defines a rear opening. The electric motor includes an output shaft supporting a rotor assembly for rotation about a motor axis. The electric motor also includes a stator assembly surrounding the rotor assembly, and a rear end cap. The rear end cap supports a rear motor bearing that rotatably supports the output shaft at a rear end. A portion of the rear end cap resides within the rear opening to close the rear opening.

20 Claims, 10 Drawing Sheets

(56) References Cited

U.S. PATENT DOCUMENTS

| | | | |
|---|---|---|---|
| 8,772,989 B2 | 7/2014 | Simm et al. | |
| 9,643,300 B2 | 5/2017 | Kumagai et al. | |
| 9,948,162 B2 | 4/2018 | Nagahama et al. | |
| RE46,827 E | 5/2018 | Rudolph et al. | |
| 2005/0150671 A1 | 7/2005 | Kuo et al. | |
| 2008/0150375 A1 | 6/2008 | Shima | |
| 2012/0138329 A1 | 6/2012 | Sun et al. | |
| 2013/0075121 A1 | 3/2013 | Nakamura et al. | |
| 2014/0091648 A1 | 4/2014 | Kumagai | |
| 2014/0182869 A1 | 7/2014 | Kumagai et al. | |
| 2016/0149463 A1* | 5/2016 | Smith | H02K 5/15 310/402 |
| 2016/0149474 A1* | 5/2016 | Smith | H02K 7/145 310/68 B |
| 2016/0354915 A1 | 12/2016 | Bartoszek et al. | |
| 2017/0203418 A1 | 7/2017 | Kumagai et al. | |
| 2018/0205288 A1 | 7/2018 | Nagahama et al. | |
| 2021/0187707 A1* | 6/2021 | Smith | B25F 5/02 |

FOREIGN PATENT DOCUMENTS

| | | |
|---|---|---|
| CN | 204772285 U | 11/2015 |
| CN | 205497396 U | 8/2016 |
| CN | 205600652 U | 9/2016 |
| CN | 108789283 A | 11/2018 |
| DE | 102010053677 A | 6/2012 |
| EP | 2075094 A1 | 7/2009 |
| EP | 3848161 A1 | 7/2021 |
| JP | 2003311657 A | 11/2003 |
| JP | 2021062444 A | 4/2021 |

\* cited by examiner

FIG. 9B

MOTOR MOUNTING ASSEMBLY FOR A POWER TOOL

FIELD OF THE DISCLOSURE

The present disclosure relates to power tools, and more specifically to electric motors for power tools.

BACKGROUND OF THE DISCLOSURE

Many power tools, such as drill drivers and hammer drills, include electric motors supported within a tool housing. Such electric motors commonly include a rotor that rotates within a stationary stator, with an air gap separating the rotor and the stator. Typically, the air gap is minimized for magnetic reasons. However, tighter air gaps can raise the likelihood that the rotor will strike or rub against the nearby stator if the parts become mis-aligned. The resulting friction can undesirably raise the operating temperature and create other issues.

To reduce the likelihood that the rotor will strike the stator, many motors employ end caps that are directly supported by the stator, and also support a rotor bearing for rotatably supporting a rotor shaft of the rotor. But, this arrangement can increase an overall length of the power tool since such motors are typically fully enclosed by two clamshell housing halves that must accommodate the added length of the end caps.

Alternatively, many power tools include a housing made from, e.g., clamshell housing halves, that directly support one or more of the rotor bearings, thereby eliminating the need for the end caps. In such power tools, the stator is also typically supported directly by the housing. While this arrangement may reduce the overall length of the power tool, it is difficult to mold the plastic housing just right so that the axis of the rotor is aligned with the axis of the stator. Thus, the likelihood of the rotor striking the stator is much greater.

SUMMARY OF THE DISCLOSURE

The present disclosure provides, in one aspect, a power tool including a housing and an electric motor supported within the housing. The housing includes a main housing portion that defines a rear opening. The electric motor includes an output shaft supporting a rotor assembly for rotation about a motor axis. The electric motor also includes a stator assembly surrounding the rotor assembly, and a rear end cap. The rear end cap supports a rear motor bearing that rotatably supports the output shaft at a rear end. A portion of the rear end cap resides within the rear opening to close the rear opening.

The present disclosure provides, in another aspect, a power tool including a housing, an electric motor supported within the housing, and an end cap coupled to the electric motor. The housing includes a main housing portion that defines a rear opening. The electric motor includes an output shaft supporting a rotor assembly for rotation about a motor axis, a stator assembly surrounding the rotor assembly, and an end cap affixed to the stator assembly. The end cap supports a motor bearing that rotatably supports the output shaft at a rear end proximate the rear opening. A portion of the end cap resides within the rear opening to close the rear opening.

The present disclosure provides, in another aspect, a power tool including a housing and an electric motor supported within the housing. The housing includes a main housing portion that defines a handle and a rear opening. The electric motor includes an output shaft supporting a rotor assembly for rotation about a motor axis, a stator assembly surrounding the rotor assembly, and a rear end cap. The rear end cap is positioned at a rear axial end of the stator assembly and supports a rear motor bearing, the rear motor bearing rotatably supporting the output shaft at a rear end. The rear end cap is coupled to the stator assembly by elongated fasteners to center the rotor assembly relative to the stator assembly. A portion of the rear end cap resides within the rear opening to close the rear opening.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
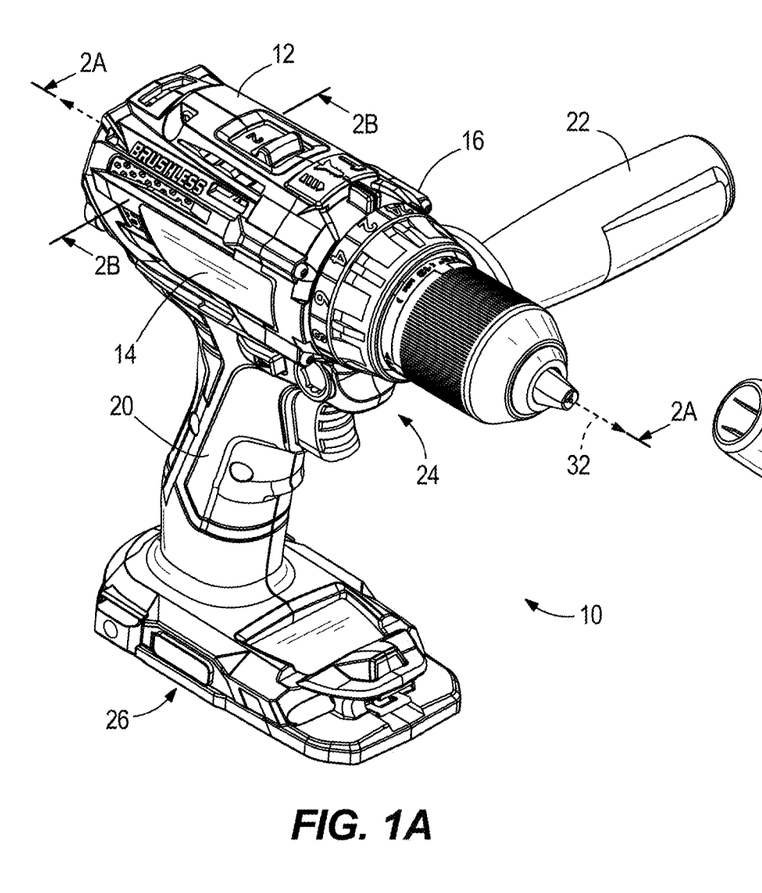
FIGS. 1A and 1B are perspective views of a hammer drill according to one embodiment.
Figure 1B:
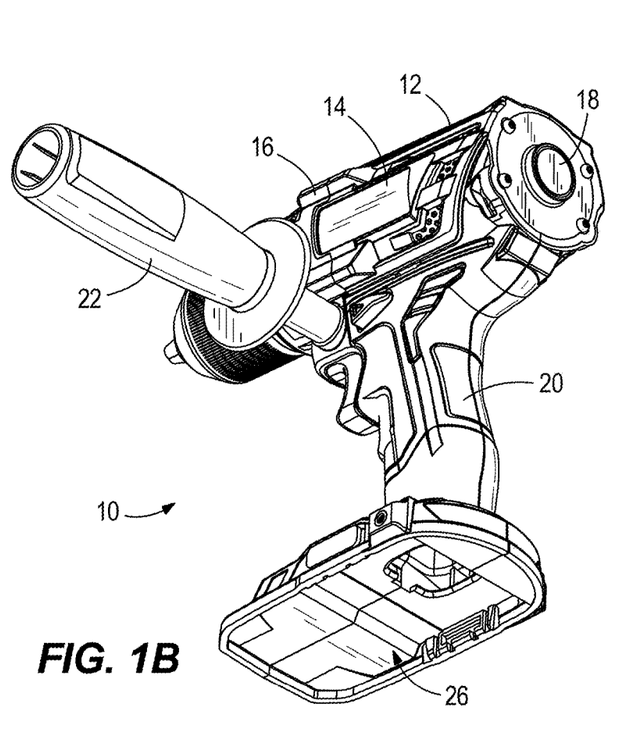
Figure 2A:
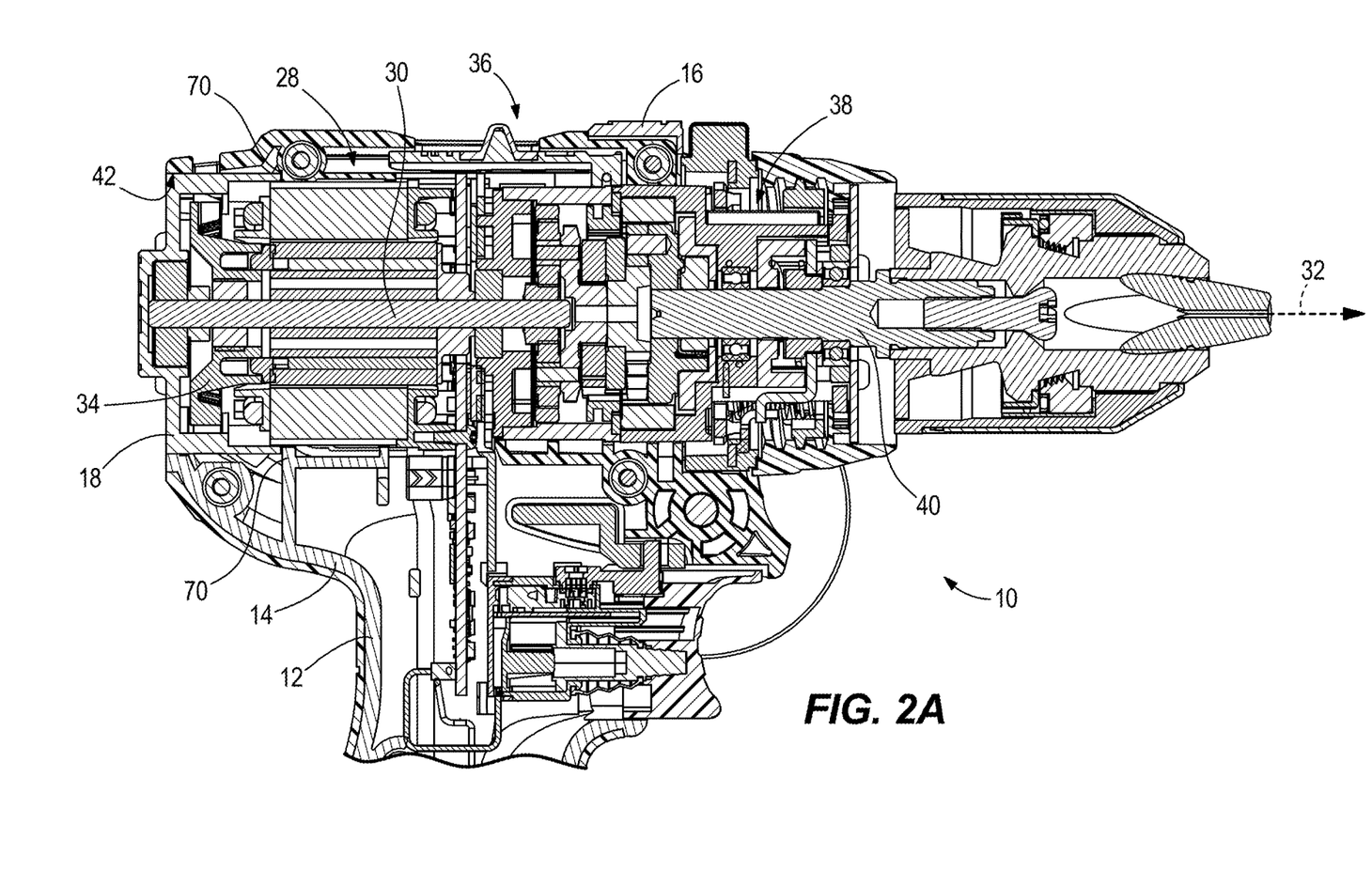
FIG. 2A is a cross-sectional view of the hammer drill of FIG. 1A, taken along line 2A-2A of FIG. 1A.

FIGS. 1A and 1B illustrate a power tool 10 including a housing 12 having a main housing portion 14 formed from, in the illustrated embodiment, clamshell housing halves 14a and 14b (FIG. 2B) that contain therein an electric motor 28 (FIG. 2A). Referring to FIGS. 5A-6B, the motor 28 includes a rotatable rotor assembly 44 surrounded by a stationary stator assembly 46. The rotor assembly 44 is affixed to a rotatable output shaft 30 that, in turn, is rotatably supported at one end by a rear motor bearing 58. The power tool 10 also includes a rear end cap 18 that is directly supported by the stator assembly 46, and also defines a rear bearing pocket 56 that receives and retains the rear motor bearing 58. Thus, as discussed in greater detail below, the rear end cap 18 directly centers the rotor assembly 44 relative to the stator assembly 46, thereby reducing a likelihood that the rotor 44 becomes misaligned with the stator assembly 46 and undesirably strikes the stator assembly 46 during operation of the motor 28.

Figure 3:
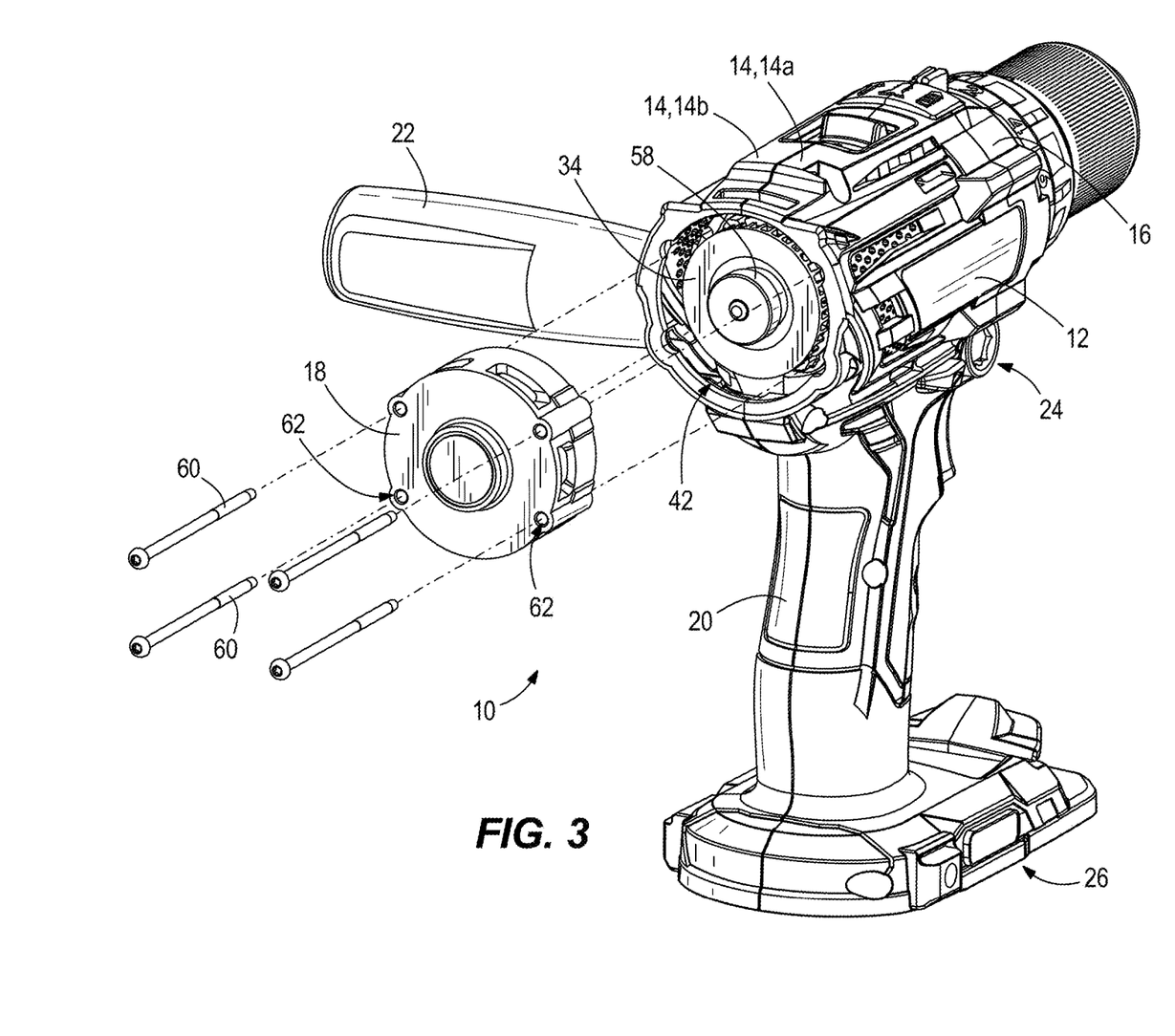
FIGS. 3 and 4 are partially exploded perspective views of the hammer drill of FIG. 1A.
Figure 4:
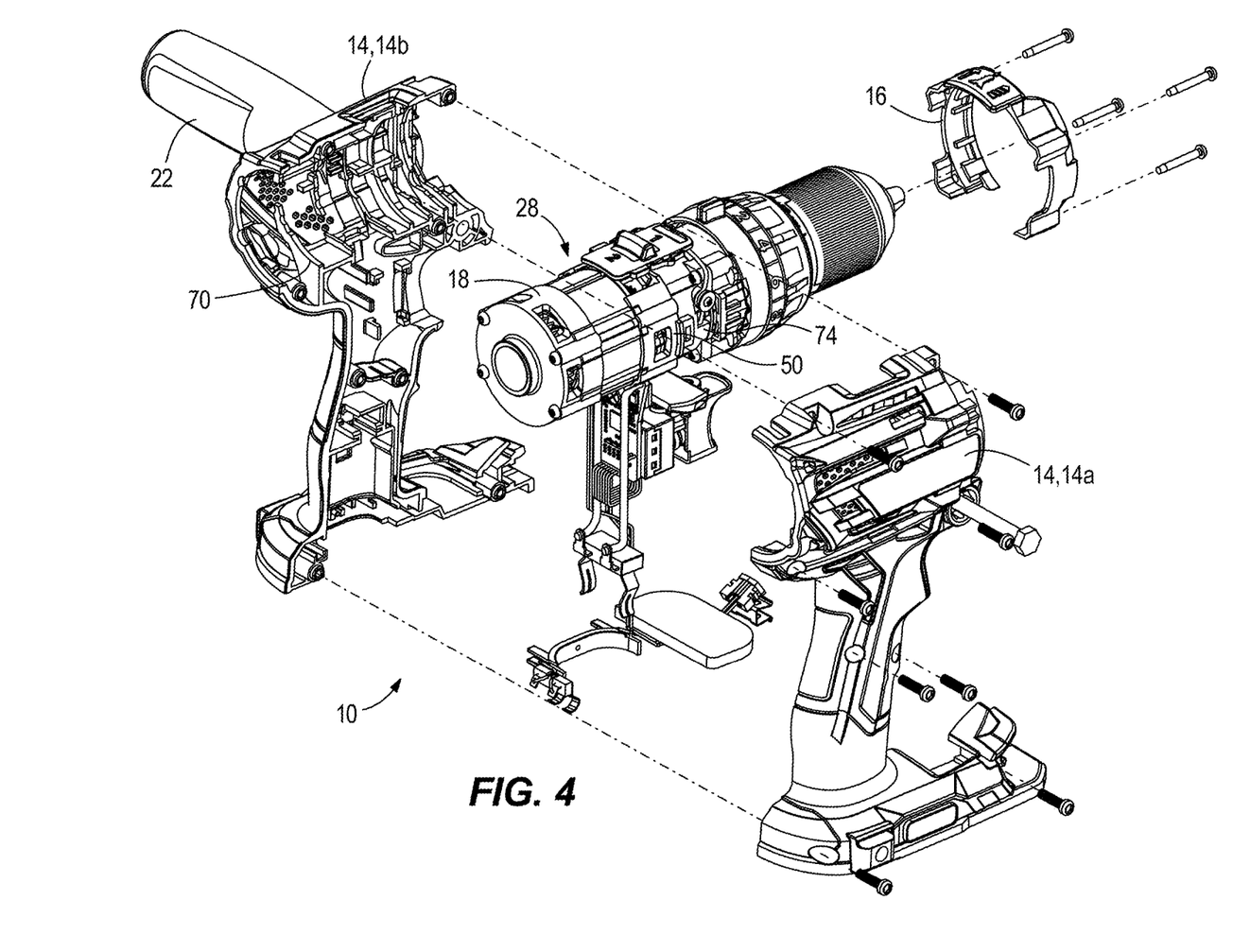
Figure 5A:
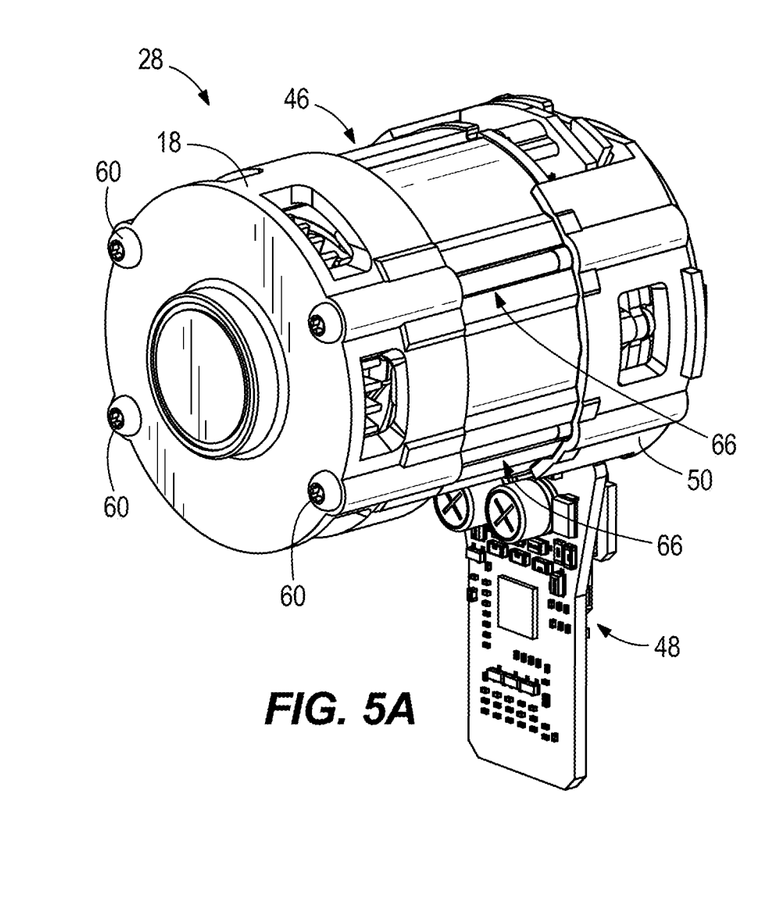
FIGS. 5A and 5B are perspective views illustrating an electric motor of the hammer drill of FIG. 1A.
Figure 5B:
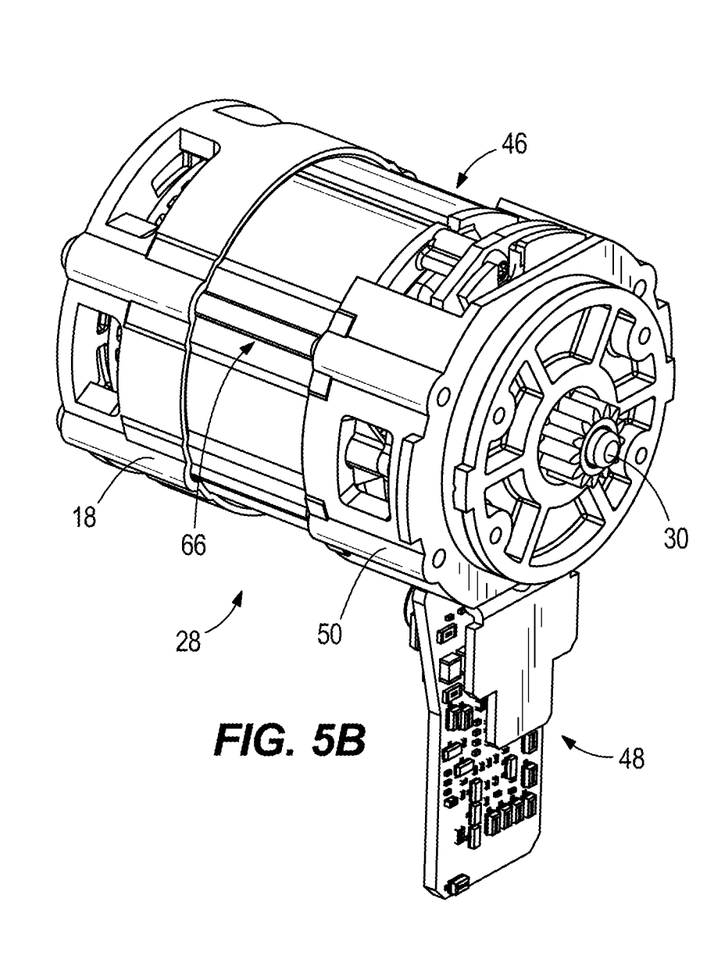
Figure 6A:
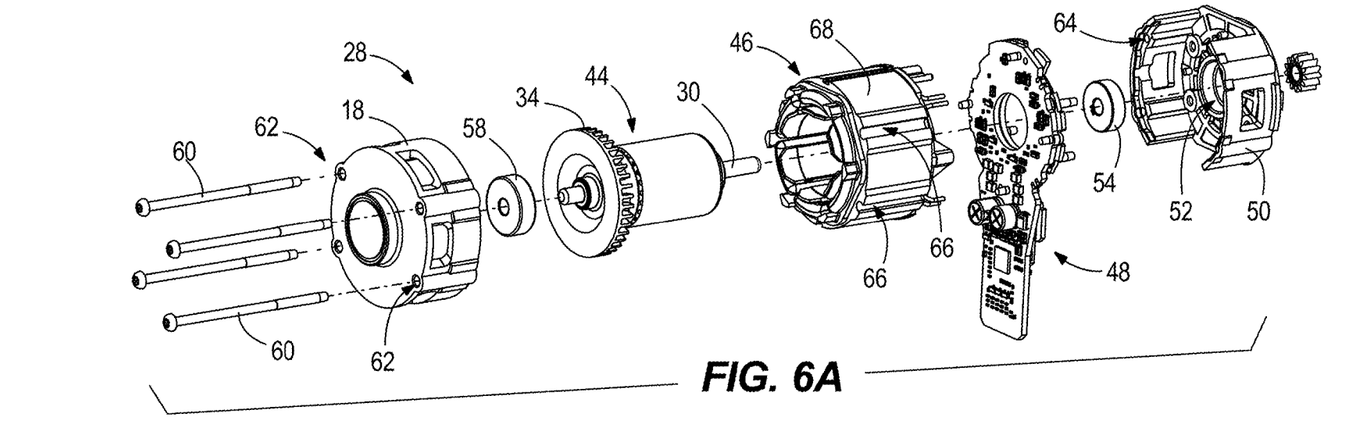
FIGS. 6A and 6B are partially exploded perspective views of the motor of FIG. 5A.
Figure 6B:
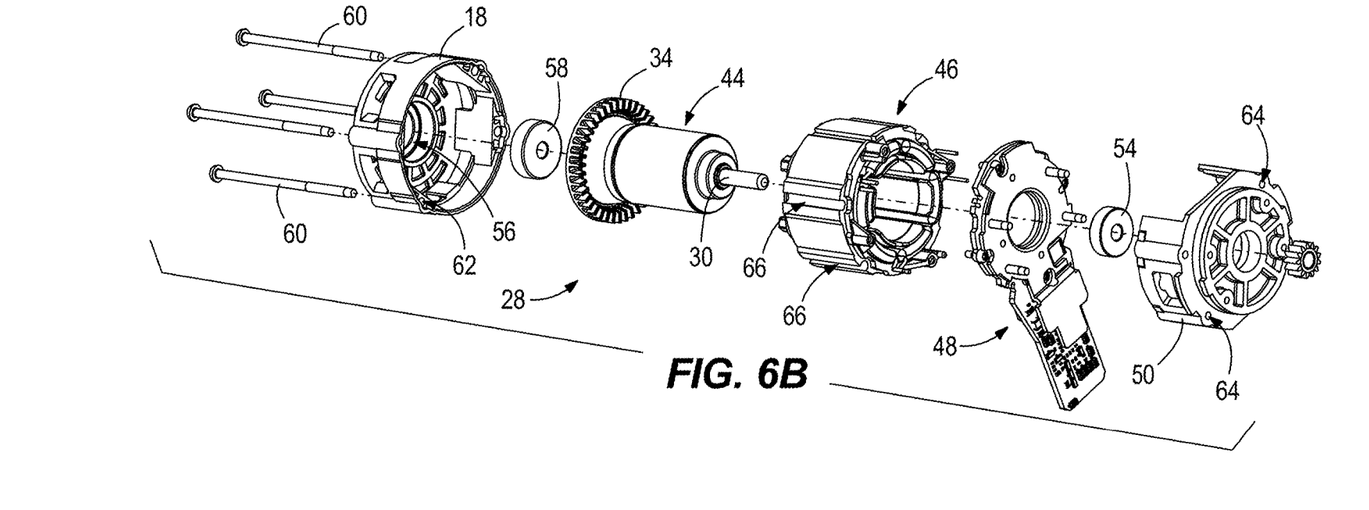
Figure 7A:
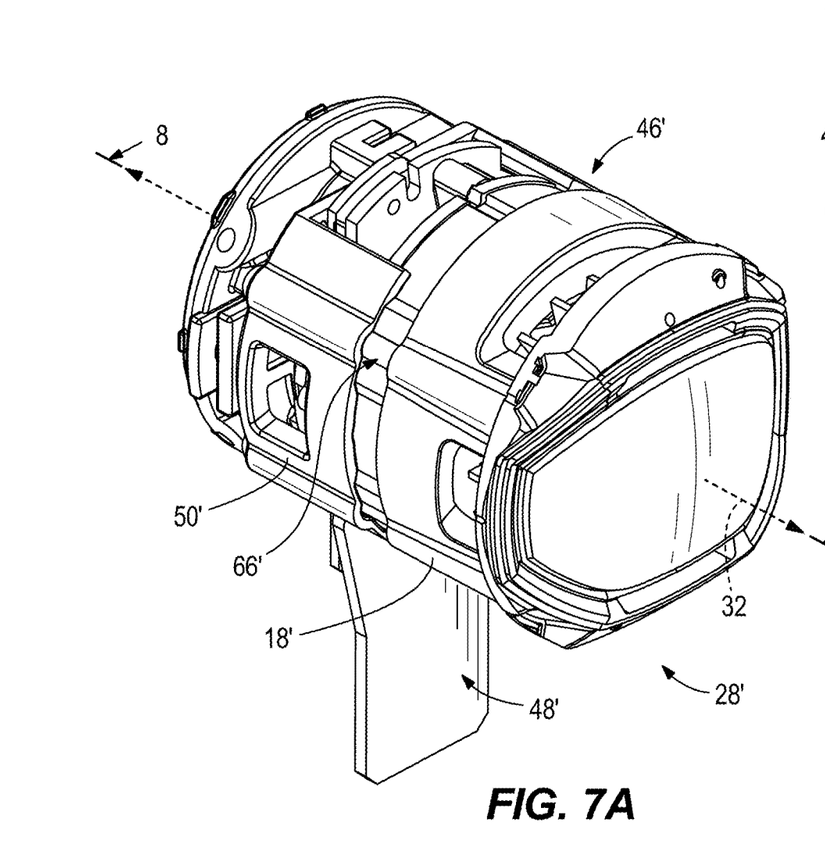
FIGS. 7A and 7B are perspective views illustrating an electric motor of the hammer drill of FIG. 1A according to another embodiment.
Figure 7B:
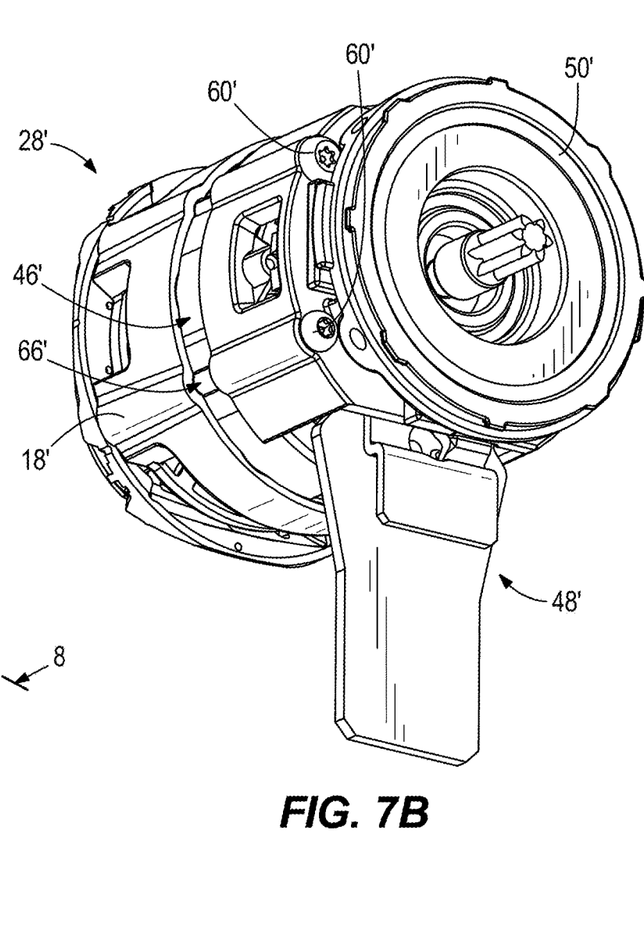
Figure 8:
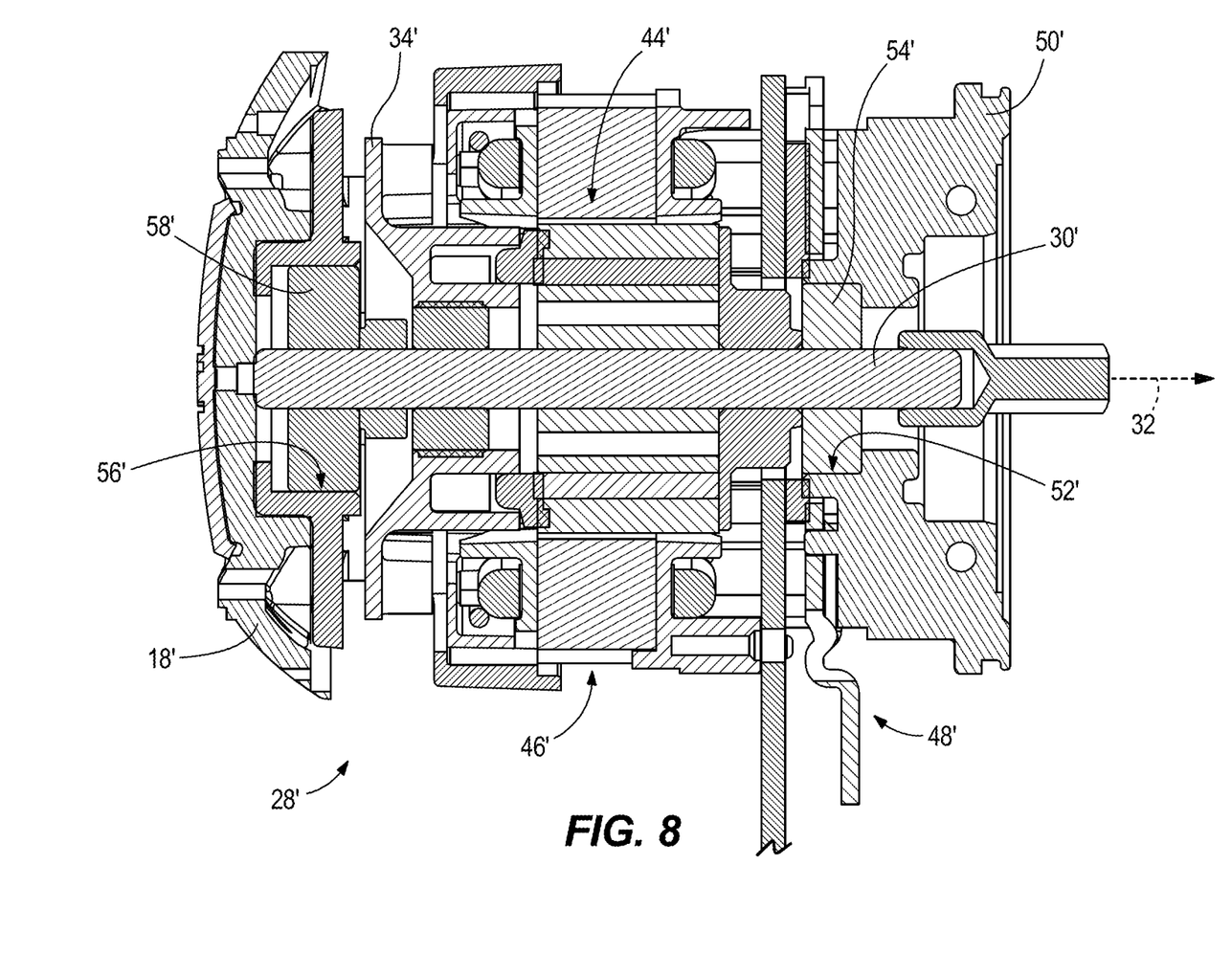
FIG. 8 is a cross-sectional view of the motor of FIG. 7A, taken along line 8-8 of FIG. 7A.
Figure 9A:
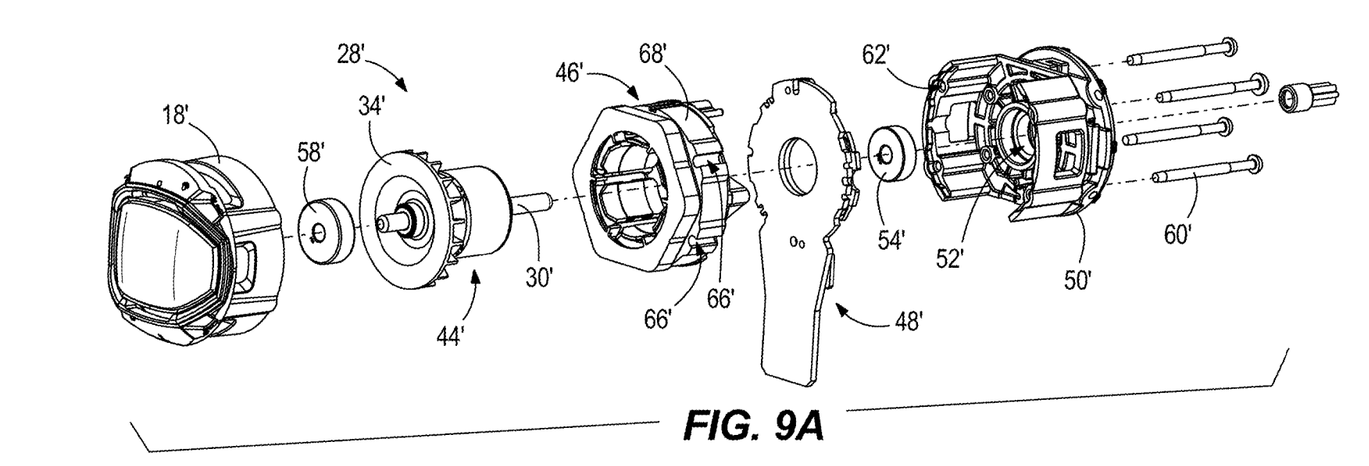
FIGS. 9A and 9B are partially exploded perspective views of the motor of FIG. 7A.
Figure 9B:
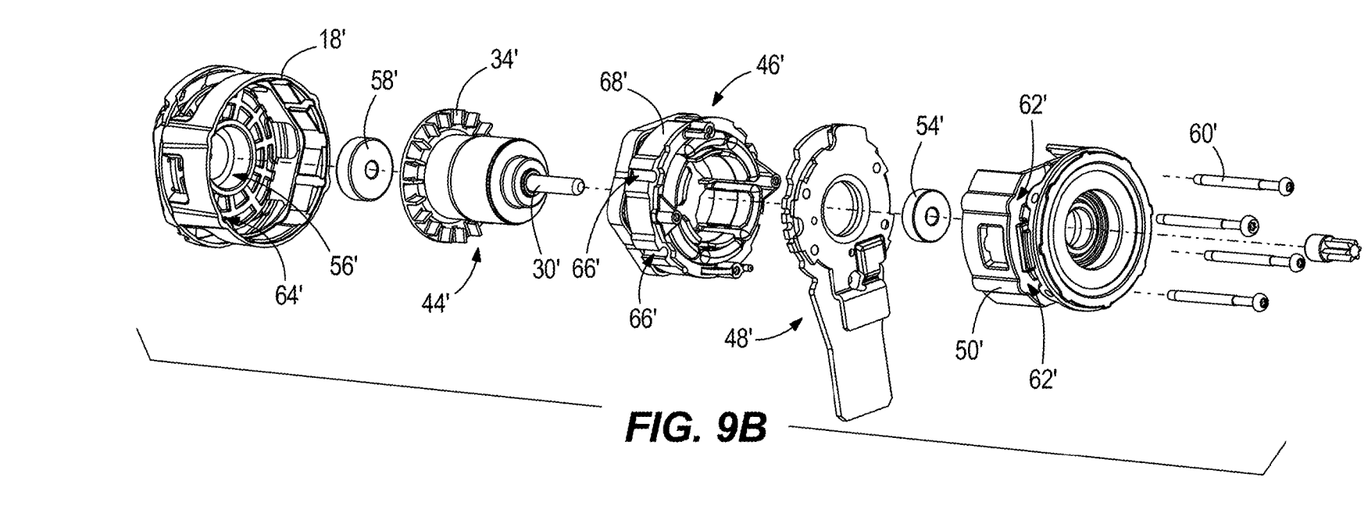

Additionally, the rear end cap 18 also forms a portion of the exterior tool housing 12. With reference to FIGS. 3 and 4, the main housing portion 14 defines a rear opening 42 at a rear end of the power tool 10. The rear end cap 18 resides within and fills the rear opening 42 to close the housing 12 and enclose the components (e.g., the motor 28, etc.) contained therein. Since the main housing portion 14 does not enclose the rear end cap 18 itself, as is commonly done in many typical power tools, this arrangement reduces an overall length of the power tool 10 as compared to such prior art power tools. Moreover, while other common prior art power tool designs instead support the rear motor bearing with the tool housing itself, the power tool 10 we has improved manufacturability as compared to such prior art power tools, by obviating the need for difficult molding of the power tool housing.

Figure 2B:
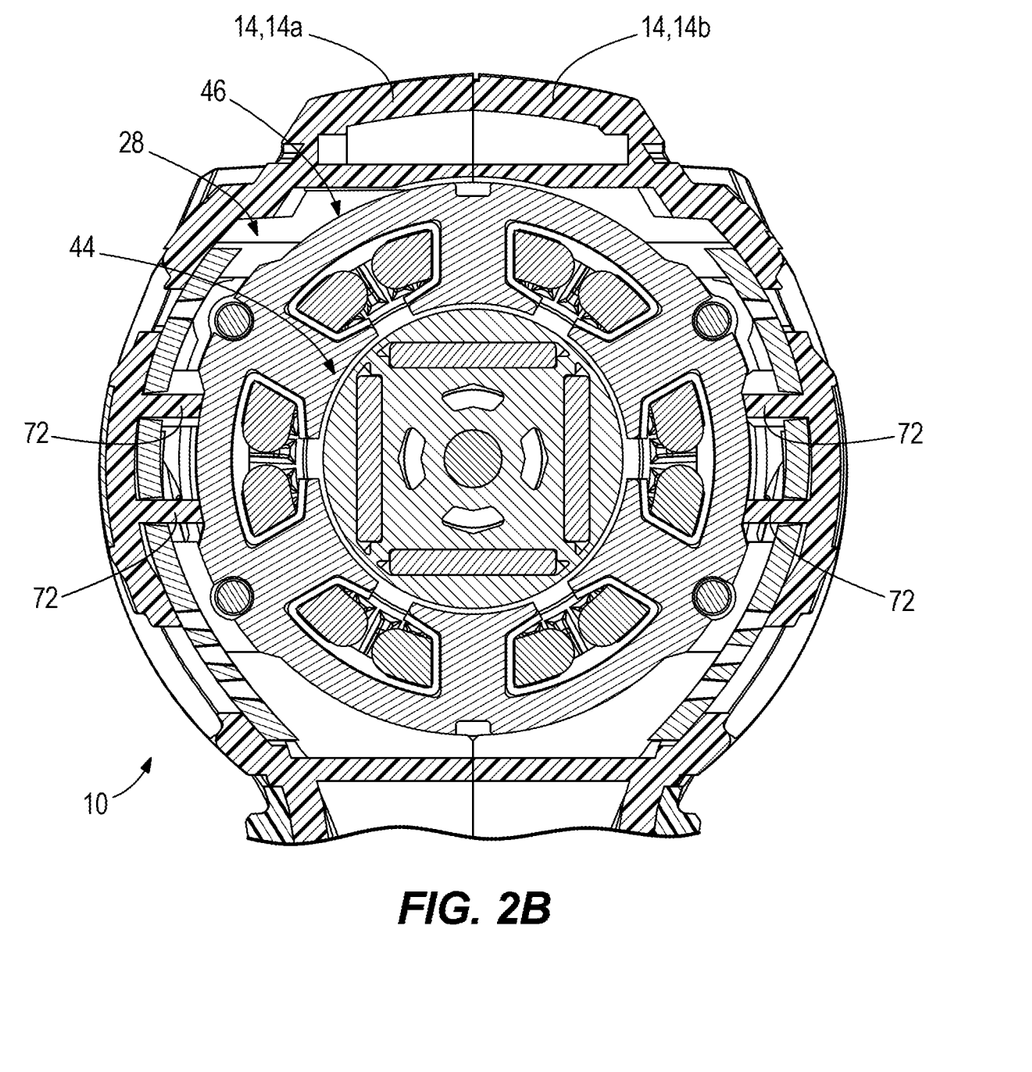
FIG. 2B is a cross-sectional view of the hammer drill of FIG. 1A, taken along line 2B-2B of FIG. 1A.

With reference again to FIGS. 1A and 1B, the power tool 10 comprises, in the illustrated embodiment, a drilling tool in the form of a hammer drill 10. However, it should be noted that the aforementioned disclosure is also applicable to other types of power tools, such as, e.g., other drilling tools (e.g., drill drivers, impact drills, and/or the like), impact tools (e.g., impact drivers and/or the like), reciprocating power tools, grinding tools, portable powered saws, and/or the like. The housing 12 includes, in addition to the main housing portion 14 and the rear end cap 18, a front housing portion 16 that couples to the main housing portion 14 (e.g., by a plurality of fasteners). The main housing portion 14 includes a handle 20 that can be grasped by a user operating the hammer drill 10. As discussed above, in the illustrated embodiment, the main housing portion 14 is defined by the cooperating clamshell halves 14a and 14b (FIG. 2B). The front housing portion 16 and the rear end cap 18 are unitary bodies. The illustrated hammer drill 10 further includes a second handle 22 coupled to a second handle mount 24 defined by the main housing portion 14 (FIG. 3). The second handle 22 may be covered by an elastomeric overmold. In other embodiments (not shown), one or both of the handle 20 and the second handle 22 may be omitted. The hammer drill 10 is operable with a battery pack (not shown) removably coupled to a battery receptacle 26 located at a bottom end of the main housing portion 14 (i.e. generally below the handle 20).

Referring again to FIGS. 2A and 2B, the electric motor 28 receives power from the battery pack when the battery pack is coupled to the battery receptacle 26. The illustrated motor 28 is a brushless direct current ("BLDC") motor 28, and the output shaft 30 is rotatable about an axis 32. A fan 34 is coupled to the output shaft 30 (e.g., via a splined connection) adjacent a rear end of the motor 28.

In some embodiments, the hammer drill 10 may include a power cord for electrically connecting the motor 28 to a source of AC power. The battery pack is the preferred means for powering the hammer drill 10, however, because a cordless hammer drill advantageously can be used in locations where other power sources are unavailable.

With continued reference to FIG. 2A, the hammer drill 10 further includes a gear assembly 36 coupled to the motor output shaft 30 and a drive assembly 38 coupled to an output of the gear assembly 36. The gear assembly 36 may be configured in any of a number of different ways to provide a speed reduction between the output shaft 30 and an input of the drive assembly 38.

The drive assembly 38 includes a spindle 40, extending from the front housing portion 16, to which a tool element (e.g., a drill bit; not shown) can be coupled for performing work on a workpiece. The drive assembly 38 is configured to selectively convert a portion of the continuous rotational force or torque provided by the motor 28 and gear assembly 36 to a striking impact force or intermittent applications of axial force to the spindle 40, which is imparted to the workpiece when the tool element is pressed against the workpiece, when the hammer drill 10 is operated in a "hammer drill" mode.

FIGS. 5A-6B illustrate the motor 28, which includes the rotor assembly 44 affixed to the output shaft 30, the stator assembly 46 surrounding the rotor assembly 44, the fan 34, a printed circuit board (PCB) assembly 48, and the rear end cap 18. As discussed above, the rear end cap 18 defines the rear bearing pocket 56 that receives the rear motor bearing 58. In the illustrated embodiment, the motor 28 also includes a front end cap 50 defining a front bearing pocket 52 that receives a front motor bearing 54. The front and rear motor bearings 54, 58 rotatably support the output shaft 30 for rotation about the axis 32. In other embodiments (not shown), the front end cap may be omitted, and the front motor bearing 54 may instead be supported by another component of the hammer drill (e.g., a gear case, a separate front bearing retainer, a portion of the housing 12, or any other structure).

The rear end cap 18 is coupled to the front end cap 50 via fasteners 60 (e.g., elongated screws) that extend through apertures 62 formed in the rear end cap 18, and tighten into corresponding threaded apertures 64 formed in the front end cap 50. The apertures 62 are inserted from the rear end of the motor 28 into the apertures 62 in the rear end cap 18, and then tightened into the threaded apertures 64 in the front end cap 50. The fasteners 60 also extend through axial grooves 66 formed in an outer circumferential surface 68 of the stator assembly 46, and engage the grooves 66 to prevent the front and rear end caps 50, 18 from rotating relative to the stator assembly 46.

With reference to FIGS. 3 and 4, as previously discussed, the main housing portion 14 defines the rear opening 42 at the rear end of the hammer drill 10. The rear end cap 18 resides within and fills the rear opening 42 to close the housing 12 and enclose the components (e.g., the motor 28, the gear assembly 36, etc.) contained therein. Since the main housing portion 14 does not enclose the rear end cap 18 itself, as is commonly done in may typical hammer drills, this arrangement reduces an overall length of the hammer drill 10 as compared to such prior art hammer drills. For example, in the illustrated embodiment, the hammer drill 10 includes a length from the front end to the rear end of approximately 8.1 inches. And, the motor 10 includes a length from the front end cap 50 to the rear end cap 18 of approximately 2.8 inches.

The rear end cap 18 is not directly attached to the main housing portion 14, but instead fastens directly to the front end cap 50 of the motor 28 via the fasteners 60 as discussed above. In this way, the fasteners 60 affix the front and rear end caps 50, 18 to the stator assembly 46. Thus, the front and rear end caps 50, 18 directly center the rotor assembly 44 relative to the stator assembly 46, thereby reducing a likelihood that the rotor 44 becomes misaligned with the stator assembly 46 and undesirably strikes the stator assembly 46 during operation of the motor 28. The rear end cap 18, which is a component of the motor 28, also forms a portion of the exterior tool housing 12, but is not required to align with any mounting features (e.g., screw bosses) formed on the main housing portion 14. Instead, the rear end cap 18 simply resides or "floats" within the rear opening 42 (FIG. 3) and closes the rear opening 42. This improves manufacturing tolerances for the hammer drill 10, and simplifies the alignment process between the motor 28, the gear assembly 36, and the drive assembly 38.

With reference to FIGS. 2A and 2B, the main housing portion 14 includes mounting features for supporting the motor 28 therein. Specifically, the main housing portion 14 includes inwardly projecting annular ribs 70 (FIG. 2A) that abut the rear end cap 18 to axially restrain the rear end cap 18, and the motor 28, relative to the main housing portion 14. Additionally, the main housing portion 14 also includes axially extending ribs 72 (FIG. 2B) that engage the outer circumferential surface 68 of the stator assembly 46 to support the motor 28 within the main housing portion 14 and prevent the motor 28 from rotating relative thereto.

With reference to FIGS. 2A and 4, the gear assembly 36 resides within a gear case 74 that is supported within the main housing portion 14. The front end cap 50 is coupled to the gear case 74 to further axially support the motor 28 within the hammer drill 10.

FIGS. 7A-9B illustrate an electric motor 28' according to another embodiment, which may be incorporated into the hammer drill 10 described above with reference to FIGS. 1A-6B. Features and elements of the motor 28' corresponding with features and elements of the motor 28 described above are given identical reference numbers, appended by a prime symbol.

The electric motor 28' includes a rotor assembly 44' affixed to an output shaft 30', a stator assembly 46' surrounding the rotor assembly 44', a fan 34', a printed circuit board (PCB) assembly 48', a front end cap 50', and the rear end cap 18'. The front end cap 50' defines a front bearing pocket 52' that receives a front motor bearing 54', and the rear end cap 18' defines a rear bearing pocket 56' that receives a rear motor bearing 58'. The front and rear motor bearings 54', 58' rotatably support the output shaft 30' for rotation about an axis 32'.

Much like that described above with respect to the motor 28, the front and rear end caps 50', 18' are coupled to one another via fasteners 60' (e.g., elongated screws) that extend between the end caps 50', 18'. However, unlike that described above, the fasteners 60' extend through apertures 62' formed in the front end cap 50' and thread into corresponding threaded apertures 64' formed in the rear end cap 18'. The fasteners 60' are inserted from the front end of the motor 28' into the apertures 62' in the front end cap 50', and then tightened into the threaded apertures 64' in the rear end cap 18'. The fasteners 60' also extend through axial grooves 66' formed in an outer circumferential surface 68' of the stator assembly 46', and engage the grooves 66' to prevent the front and rear end caps 50', 18' from rotating relative to the stator assembly 46'.

In the illustrated embodiment, the motor 28' includes a length from the front end cap 50' to the rear end cap 18' of approximately 2.6 inches. Like the motor 28 described above, the motor 28' is configured such that the rear end cap 18' forms a portion of the outer tool housing, or in other words, is not enclosed within a separate tool housing, when the motor 28' is assembled within a power tool such as the hammer drill 10 described above. This affords the same advantages as described above with regard to the hammer drill 10, namely, it reduces the overall length of the power tool while improving the centering of the rotor assembly 44' relative to the stator assembly 46', and improves manufacturability of the housing of the power tool.

Various features of the invention are set forth in the following claims.

What is claimed is:

1. A power tool comprising:
    a housing including a main housing portion that defines a rear opening;
    an electric motor supported within the housing, the electric motor including
        an output shaft supporting a rotor assembly for rotation about a motor axis,
        a stator assembly surrounding the rotor assembly, and
        a rear end cap supporting a rear motor bearing, the rear motor bearing rotatably supporting the output shaft at a rear end;
    wherein a portion of the rear end cap resides within the rear opening to close the rear opening, wherein the main housing portion includes an inwardly projecting annular rib, and wherein the rear end cap abuts the annular rib.

2. The power tool of claim 1, wherein the rear end cap is coupled to a front end cap that supports a front motor bearing, the front motor bearing rotatably supporting the output shaft at a front end.

3. The power tool of claim 2, wherein the rear end cap is coupled to the front end cap via fasteners.

4. The power tool of claim 3, wherein the fasteners extend through first apertures defined in the rear end cap and tighten into second apertures defined in the front end cap.

5. The power tool of claim 3, wherein the fasteners extend through first apertures defined in the front end cap and tighten into second apertures defined in the rear end cap.

6. The power tool of claim 1, further comprising a gear case assembly supported within the main housing portion, wherein a front end cap is coupled to the gear case assembly.

7. The power tool of claim 1, wherein the main housing portion includes an axially extending rib that engages an outer circumferential surface of the stator assembly.

8. The power tool of claim 1, wherein the main housing portion comprises two clamshell halves, and each clamshell half defines a portion of the rear opening.

9. A power tool comprising:
    a housing including a main housing portion that defines a rear opening;
    an electric motor supported within the housing, the electric motor including
        an output shaft supporting a rotor assembly for rotation about a motor axis,
        a stator assembly surrounding the rotor assembly, and
        a rear end cap supporting a rear motor bearing, the rear motor bearing rotatably supporting the output shaft at a rear end proximate the rear opening; and
        a front end cap opposite the rear end cap with respect to the stator assembly, the front end cap supporting a front motor bearing, the front motor bearing rotatably supporting the output shaft at a front end;
    wherein a portion of the rear end cap resides within the rear opening to close the rear opening, and
    wherein the rear end cap is coupled to the front end cap by a plurality of elongated fasteners that extend between the rear end cap and the front end cap.

10. The power tool of claim 9, wherein the fasteners extend through axial grooves formed in an outer circumferential surface of the stator assembly.

11. The power tool of claim 9, wherein the main housing portion includes an inwardly projecting annular rib, and wherein the rear end cap abuts the annular rib.

12. The power tool of claim 9, wherein the main housing portion comprises two clamshell halves, and each clamshell half defines a portion of the rear opening.

13. A power tool comprising:
   a housing including a main housing portion that defines a handle and a rear opening; and
   an electric motor supported within the housing, the electric motor including
      an output shaft supporting a rotor assembly for rotation about a motor axis,
      a stator assembly surrounding the rotor assembly, and
      a rear end cap positioned at a rear axial end of the stator assembly and supporting a rear motor bearing, the rear motor bearing rotatably supporting the output shaft at a rear end,
   wherein a portion of the rear end cap resides within the rear opening to close the rear opening, and wherein the rear end cap is not directly attached to the main housing.

14. The power tool of claim 13, wherein the rear end cap is coupled to a front end cap that supports a front motor bearing, the front motor bearing rotatably supporting the output shaft at a front end.

15. The power tool of claim 14, wherein the fasteners extend through first apertures defined in the rear end cap and tighten into second apertures defined in the front end cap.

16. The power tool of claim 14, wherein the fasteners extend through first apertures defined in the front end cap and tighten into second apertures defined in the rear end cap.

17. The power tool of claim 13, wherein the main housing portion includes an inwardly projecting annular rib, and wherein the rear end cap abuts the annular rib.

18. The power tool of claim 13, wherein the rear end cap fills the rear opening and floats within the rear opening.

19. The power tool of claim 13, wherein the rear end cap is not attached to any mounting features formed on the main housing.

20. The power tool of claim 13, wherein the rear end cap is not attached to screw bosses on the main housing.

* * * * *